United States Patent Office 3,227,672
Patented Jan. 4, 1966

3,227,672
WATER SOLUBLE CATIONIC COPOLYMERS OF β-HYDROXYALKYL ETHLENICALLY UNSATURATED ESTER WITH VINYL TERTIARY AMINE
Joseph Fertig, New York, N.Y., and Henry Stanley, Newark, N.J., assignors to National Starch and Chemical Corporation, New York, N.Y., a corporation of Delaware
No Drawing. Filed Dec. 12, 1962, Ser. No. 243,988
6 Claims. (Cl. 260—29.6)

This invention relates to the preparation of novel water soluble cationic copolymers, as well as to the copolymers thus prepared.

Several types of cationic copolymers which generally contain tertiary amine groups have been employed in the preparation of coatings, primers, pigment binders, and similar products wherein their cationic nature is of advantage. Wider utilization of these copolymers has been limited, however, by the fact that such copolymers have not heretofore exhibited an appreciable degree of water solubility. Many industrial processes requiring the use of completely aqueous systems are therefore unable to make use of these cationic copolymers. Moreover, attempts to employ organic solvent solutions of these copolymers in aqueous systems usually results in the coagulation and precipitation of the copolymer.

It is an object of this invention to prepare cationic copolymers in novel water soluble forms which permit their usage in a variety of applications.

Other objects and the advantages of this invention will be apparent from the discussion that follows hereinafter.

In accordance with the invention, water soluble cationic copolymers are prepared by polymerizing a beta-hydroxyalkyl ester of acrylic or methacrylic acid with an ethylenically unsaturated tertiary amine, i.e., vinyl tertiary amine. It is the presence of these beta-hydroxyalkyl acrylates or methacrylates in our novel cationic copolymers which increases the water solubility of these polymers to a degree which makes possible their use in a number of applications wherein cationic copolymers of the prior art were not useful.

The beta-hydroxyalkyl acrylate and methacrylate esters applicable in the preparation of our novel copolymers may be selected from among those wherein the alkyl groups of said ester contain from 2 to 3 carbon atoms.

Any vinyl unsaturated tertiary amine capable of undergoing polymerization may be used to prepare our copolymers. Exemplary of such vinyl amines are the monovinyl pyridines which have the structure:

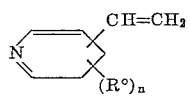

where R° is hydrogen or an alkyl group having from 1 to 12 carbon atoms and $n$ is an integer having a value from 1 to 4. Examples of these pyridyl compounds include: 2-vinyl pyridine; 3-vinylpyridine; 4-vinylpyridine; 2-methyl-5-vinylpyridine; and similar compounds. Other monomers containing tertiary amine groups include compounds having the structure:

$$CH_2=C(R)AYNR'R''$$

where R is hydrogen or a methyl group; A is oxygen, sulfur, ester moiety or amido; Y is an alkylene group having from 2 to 8 carbon atoms; R', when not directly attached to R'', is phenyl, methylbenzyl, benzyl, cyclohexyl or an alkyl group having 1 to 6 carbon atoms; R'', when not directly attached to R', is phenyl, methylbenzyl, benzyl, cyclohexyl or an alkyl group having 1 to 6 carbon atoms; and R' and R'', when directly connected together, may be the morpholino residue —$C_2H_4OC_2H_4$—, the piperidino residue —$(CH_2)_5$—, or the pyrrolidino residue —$(CH_2)_4$—.

Examples of these latter compounds include: 2-dimethylaminoethyl acrylate or methacrylate; 2-diethylaminoethyl acrylate or methacrylate; 2-diphenylaminoethyl acrylate or methacrylate; 2-morpholinoethyl acrylate or methacrylate; 2-piperidinoethyl vinyl ether or sulfide; 2-pyrrolidinoethyl vinyl ether or sulfide; 3-diethylaminopropyl acrylate or methacrylate; 2-dibenzylaminopropyl acrylate or methacrylate; and similar compounds.

The copolymers of our invention may also be prepared with a third ethylenically unsaturated comonomer which serves to modify the properties of the copolymer. Among the various vinyl comonomers which may be incorporated in our compositions may be included styrene; alpha-methyl styrene; the acrylic and methacrylic acid esters of aliphatic alcohols such as methyl, ethyl, propyl, butyl, isobutyl, amyl, hexyl, 2-ethyl hexyl, octyl, lauryl, and stearyl alcohols; isoprene; butadiene; acrylamide; acrylonitrile; methacrylonitrile; vinyl propionate; dibutyl maleate; dibutyl fumarate; vinylidene chloride; vinyl chloride; vinyl acetate; ethylene; propylene; and the like. Any of these monomers may be used either alone or in combination with one another together with the beta-hydroxyalkyl ester and vinyl tertiary amine components of our copolymers.

The actual polymerization process utilized in preparing our novel copolymers may be any of the methods commonly used to prepare aqueous solution polymers. In these procedures, the entire monomer charge may be initially present in the water-organic solvent blend which serves as the reaction medium. Alternatively, only a portion of the monomer charge may be present initially, with the remainder being added in small portions during the course of the reaction. For the purposes of our invention, it is preferred that the initial reaction mixture contain up to about 10%, by weight, of the total monomer charge, the remainder of the charge being thereafter added during the course of the reaction. The presence of a free radical type catalyst is also required in the reaction mixture. These catalysts may be added initially to the reaction mixture or they may be added gradually during the reaction.

The reaction medium employed in our process is usually an organic solvent-water blend. Although water may, in some cases, be excluded from the blend, it is preferred that up to about 80%, by weight, of water be included therein. Among the organic solvents applicable to our procedure may be included methyl alcohol, ethyl alcohol, isopropyl alcohol, tetrahydrofuran, acetonitrile, and the like. When an organic solvent-water blend is employed, the solvent should be water miscible and low boiling in order to facilitate the subsequent removal of the solvent from the reaction prduct.

The free radical catalysts which can be utilized in our process may be selected from the group consisting of hydrogen peroxide and inorganic persalts such as, for example, water soluble alkali metal persulfates, blends of the latter with alkali metal bisulfites, alkali metal perborates, ammonium persulfates, and ammonium perborates. Other catalysts suitable for the purposes of our invention include: organic hydroperoxides, such as t-butyl hydroperoxide; organic peroxides, such as acetyl peroxide and benzoyl peroxide; water soluble thiosulfate compounds; water soluble hydrosulfite compounds; thiourea; and, the salts of metals having more than one valence state, e.g., cobalt, iron, nickel, copper, and the like.

These catalysts should be utilized in a concentration of from about 0.01% to 3.0%, as based upon the total weight of the monomer charge, with the preferred range being in the order of from 0.1% to 1.0%, by weight.

For the purposes of this invention, our water soluble cationic copolymers should contain from about 65 to 90%, by weight, of the beta-hydroxyalkyl acrylate or methacrylate and from about 2 to 15%, by weight, of the vinyl tertiary amine. Moreover, if desired, up to 20%, by weight, of the copolymer may comprise one of the previously listed vinyl comonomers. Copolymers employing less than the amount of the beta-hydroxyalkyl acrylate or methacrylate given above result in a product lacking the advantageous water solubility of the copolymers of our invention. As the amount of the beta-hydroxyalkyl acrylate or methacryate ester decreases, the water solubility of the resulting copolymer is, in turn, lessened. A similar reduction in water solubility may be effected by increasing the concentration of the optional vinyl comonomer or by decreasing the concentration of the vinyl tertiary amine.

The reaction leading to the preparation of the novel copolymers of our invention may be run at temperatures ranging from about 20° C. to about 90° C., with optimum temperatures ranging from 60° C. to 80° C. The reaction time of our process usually varies from about 3 hours to about 6 hours. Following the completion of the reaction, the organic solvent portion of the reaction medium may be removed by distillation, thereby yielding an aqueous solution of the copolymer which may be directly used in a number of applications. Where desired, however, the copolymer solution may be utilized directly without removal of the organic solvent.

The resin solids content of our copolymer solutions may range from about 10% to about 50%, by weight, with the preferred range being in the order of from 25% to 40%, by weight.

The vinyl tertiary amines employed in our procedure are usually utilized in the form of their amine salts which are prepared prior to the polymerization process by the neutralization of the amine. Any of the common inorganic or organic acids may be utilized to neutralize these amines. Exemplary of these acids are formic, acetic, chloracetic, propionic, butyric, trimethyl acetic, glycollic, citric, hydrochloric, hydrobromic, sulfuric, nitric, phosphoric, and the like. These acidic compounds are generally employed in stoichiometrical equivalent amounts in relation to the amount of tertiary amine monomer. We have found that essentially complete neutralization of the amine monomer is necessary in order to avoid a high pH in the reaction mixture with the consequent hydrolysis of the monomers or the resulting cationic copolymer. The amount of acid added should be closely controlled since a substantial excess of acid will also cause hydrolysis of the monomers or the resulting cationic copolymer. Although an amount of inorganic acid in excess of that required to neutralize the amine is to be avoided, organic acids may, on the other hand, be used in an excess of about 20%, by weight, of such amount.

Films and coatings may be cast from our copolymer solutions onto a wide variety of substrates such as paper, leather, metal foil, wood, and other surfaces. These films will vary in their properties according to the specific composition of the copolymer. However, in all cases, these films and coatings will be water soluble. These films may also be employed in various packaging applications such as packages for detergents, bleaches, and other laundering agents.

In the following examples, which further illustrate the embodiment of our invention, all parts given are by weight, unless otherwise indicated.

Example I

This example illustrates the preparation of a water soluble, cationic copolymer by means of the process of our invention.

In carrying out the process of our invention, 301 parts of water were mixed with 70 parts of methanol, the temperature of the resulting solvent blend then being raised to 70° C. and a stream of nitrogen was introduced into the reaction. Thirty parts of dimethyl aminoethyl methacrylate were neutralized with 6.3 parts of sulfuric acid and were thereupon mixed with 150 parts of beta-hydroxypropyl acrylate and 20 parts of acrylonitrile, thus forming a homogeneous monomer mixture to which was also added 0.4 part of an ammonium persulfate polymerization catalyst. Ten percent, by weight, of this monomer mixure was thereupon uniformly added to the above described methanol-water reaction mixture over a period of 2 hours, the reaction temperature being maintanied at 70° C. for the entire reaction period. After addition of the monomer mixture had been completed, the reaction was continued at a temperature of 70° C. for an additional 2 hours. At the end of this period, the methanol was removed by distilling the reaction mixture, and, after being cooled to room temperature, the product was removed from the reaction vessel.

The resulting aqueous solution of the 15:3:2 beta-hydroxypropyl acrylate:dimethyl aminoethyl methacrylate:acrylonitiles terpolymer had a resin solids content of 40%, a pH of 4.5, and an intrinsic viscosity (in methanol at 20° C.) of 0.45. Films cast from this solution were soft and clear and could be readily dissolved in water.

Example II

This example illustrates the preparation of additional water-soluble cationic copolymers by means of the process of our invention.

The copolymers set forth in the following table were prepared by means of the polymerization procedure set forth in Example I. Films cast from each of the resulting copolymer solutions were soluble in water.

| Component | Formulation Number | | | | | | | | | | |
|---|---|---|---|---|---|---|---|---|---|---|---|
| | 1 | 2 | 3 | 4 | 5 | 6 | 7 | 8 | 9 | 10 | 11 |
| Hydroxyethyl acrylate | 75 | | | 75 | 75 | 75 | 75 | 75 | 75 | | |
| Hydroxyethyl methacrylate | | 75 | | | | | | | | 65 | 90 |
| Hydroxypropyl methacrylate | | | 75 | | | | | | | | |
| Dimethyl aminoethyl methacrylate | 15 | 15 | 15 | | | | | | | 15 | 10 |
| Diethyl aminoethyl methacrylate | | | | 15 | | | | | | | |
| Dimethyl aminoethyl acrylate | | | | | 15 | | | | | | |
| Ethyl acrylate | | | | | | | | | | 20 | |
| Sulfuric Acid | 4.87 | 4.87 | 4.87 | 4.13 | 5.21 | 7.23 | 6.38 | 5.39 | 7.23 | 4.87 | 3.25 |
| Vinyl Acetate | 10 | 10 | 10 | 10 | 10 | 10 | 10 | 10 | 10 | | |
| Ammonium persulfate | 0.2 | 0.2 | 0.2 | 0.2 | 0.2 | 0.2 | 0.2 | 0.2 | 0.2 | 0.2 | 0.2 |
| Water | 150.5 | 150.5 | 150.5 | 150.5 | 150.5 | 150.5 | 150.5 | 150.5 | 150.5 | 150.5 | 15.50 |
| Methanol | 35 | 35 | 35 | 35 | 35 | 35 | 35 | 35 | 35 | 35 | 35 |
| Vinyl pyridine | | | | | | 15 | | | | | |
| Methyl vinyl pyridine | | | | | | | 15 | | | 15 | |
| Dimethyl aminopropyl vinyl ether | | | | | | | | 15 | | | |

Example III

This example further illustrates the preparation of additional water-soluble cationic copolymers by means of the process of our invention.

The formulations set forth in the following table were prepared by means of the polymerization procedure set forth in Example I. Films cast from each of the resulting copolymer solutions were soluble in water.

| Components | Formulation Number | | | | | |
|---|---|---|---|---|---|---|
| | 1 | 2 | 3 | 4 | 5 | 6 |
| Hydroxypropyl acrylate | 150 | 150 | 150 | 150 | 90 | 72 |
| Dimethyl aminoethyl methacrylate | 30 | 30 | 30 | 30 | 2 | 20 |
| Sulfuric acid | 9.74 | 9.74 | 9.74 | 9.74 | .65 | 6.49 |
| Ammonium persulfate | 0.4 | 0.4 | 0.4 | 0.4 | 0.2 | 0.2 |
| Water | 301 | 301 | 301 | 301 | 150.5 | 150.5 |
| Methanol | 70 | 70 | 70 | 70 | 35 | 35 |
| Vinyl acetate | 20 | | | | 8 | 8 |
| Butyl acrylate | | 20 | | | | |
| Ethyl acrylate | | | 20 | | | |
| Methyl methacrylate | | | | 20 | | |

Example IV

This example illustrates the preparation of additional water soluble cationic copolymers of our invention wherein various types of acids were employed to neutralize the ethylenically unsaturated tertiary amine.

The formulations set forth in the table below were prepared by means of the procedure set forth in Example I. Films cast from each of the resulting copolymer solutions were soluble in water.

| Components | Formulation number | | | | | | |
|---|---|---|---|---|---|---|---|
| | 1 | 2 | 3 | 4 | 5 | 6 | 7 |
| Hydroxyethyl acrylate | 75 | 75 | 75 | 75 | 75 | 75 | 75 |
| Dimethyl aminoethyl methacrylate | 15 | 15 | 15 | 15 | 15 | 15 | 15 |
| Acrylonitrile | 10 | 10 | 10 | 10 | 10 | 10 | 10 |
| Ammonium persulfate | 0.2 | 0.2 | 0.2 | 0.2 | 0.2 | 0.2 | 0.2 |
| Water | 150.5 | 150.5 | 150.5 | 150.5 | 150.5 | 150.5 | 150.5 |
| Methanol | 35 | 35 | 35 | 35 | 35 | 35 | 35 |
| Hydrochloric acid (36% aqueous solution) | 9.4 | | | | | | |
| Nitric acid (70% aqueous solution) | | 9.0 | | | | | |
| Phosphoric acid (85% aqueous solution) | | | 5.8 | | | | |
| Acetic acid (glacial) | | | | 5.6 | | | |
| Formic acid (glacial) | | | | | 4.4 | | |
| Chloracetic acid (glacial) | | | | | | 8.9 | |
| Propionic acid (glacial) | | | | | | | 7.1 |

Any departure from the above description which conforms to the present invention is intended to be included within the scope of the invention as defined by the following claims.

What is claimed is:

1. A water soluble cationic polymer of:
   (1) a vinyl tertiary amine selected from the group consisting of the monovinyl pyridines which have the structure:

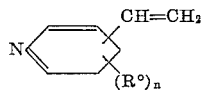

wherein R° is a radical selected from the group consisting of hydrogen and alkyl groups having from 1 to 12 carbon atoms and wherein $n$ is an integer having a value of from 1 to 4, and the monomers having the structure:

$$CH_2=C(R)AYNR^1R^2$$

wherein
   R is a radical selected from the group consisting of the hydrogen and methyl groups;
   A is a radical selected from the group consisting of the oxygen, sulfur, ester moiety, and amido groups;
   Y is an alkylene group having from 2 to 8 carbon atoms;
   $R^1$, when not directly attached to $R^2$, is a radical selected from the group consisting of phenyl, methylbenzyl, benzyl, cyclohexyl, and alkyl groups having 1 to 6 carbon atoms;
   $R^2$, when not directly attached to $R^1$, is a radical selected from the group consisting of phenyl, methylbenzyl, benzyl, cyclohexyl and alkyl groups having from 1 to 6 carbon atoms;
   and $R^1$ and $R^2$ when directly connected to one another, are radicals selected from the group consisting of the morpholino, piperidino, and the pyrrolidino radicals;
   (2) a beta-hydroxyalkyl ester comonomer selected from the group consisting of the beta-hydroxyalkyl acrylates and betahydroxyalkyl methacrylates having an alkyl group containing from 2 to 3 carbon atoms; and
   (3) at least one other ethylenically unsaturated comonomer selected from the group consisting of styrene, alphamethyl styrene, alkyl esters of acrylic and methacrylic acid, acrylamide, acrylonitrile, methacrylonitrile, isoprene, butadiene, vinyl chloride, vinyl acetate, vinyl propionate, ethylene, propylene, dibutyl maleate and dibutyl fumarate; wherein said vinyl tertiary amine is present in the polymer in a concentration of from about 2 to 15%, by weight, said betahydroxyalkyl ester is present in the polymer in a concentration of from about 65 to 90%, by weight, and said ethylenically unsaturated co-monomer is present in the polymer in a concentration of from about 0 to 20%, by weight.

2. A solution, in an organic solvent-water blend, of the water soluble cationic polymer of claim 1, wherein the resin solids content of said solution ranges from about 10 to 50%, by weight.

3. A solution, in water, of the water soluble cationic polymer of claim 1, wherein the resin solids content of said solution ranges from about 10 to 50%, by weight.

4. A process for the preparation of water-soluble cationic polymers which comprises heating in an organic solvent-water reaction medium at a temperature from about 20° to 90° C. and in the presence of a free radical catalyst, which is present in said reaction medium in a concentration of from about 0.01 to 3.0% based upon the total weight of monomers in said reaction medium, a monomer charge comprising:
   (1) a vinyl tertiary amine selected from the group consisting of the monovinyl pyridines which have the structure:

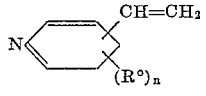

wherein
   R° is a radical selected from the group consisting of the hydrogen radical and alkyl groups having from 1 to 12 carbon atoms and wherein $n$ is an integer having a value of from 1 to 4; and, the monomers having the structure:

$$CH_2=C(R)AYNR^1R^2$$

wherein R is a radical selected from the group consisting of the hydrogen and methyl groups;

A is a radical selected from the group consisting of the oxygen, sulfur, ester moiety, and amido groups;

Y is an alkylene group having from 2 to 8 carbon atoms;

$R^1$, when not directly attached to $R^2$, is a radical selected from the group consisting of phenyl, methylbenzyl, benzyl, cyclohexyl, and alkyl groups having from 1 to 6 carbon atoms;

$R^2$, when not directly attached to $R^1$, is a radical selected from the group consisting of phenyl, methylbenzyl, benzyl, cyclohexyl and alkyl groups having from 1 to 6 carbon atoms;

and $R^1$ and $R^2$, when directly connected to one another, are radicals selected from the group consisting of the morpholino, piperidino, and the pyrrolidino radicals;

(2) a beta-hydroxyalkyl ester comonomer selected from the group consisting of the beta-hydroxyalkyl acrylates and beta-hydroxyalkyl methacrylates having an alkyl group containing from 2 to 3 carbon atoms; and, (3) at least one other ethylenically unsaturated comonomer selected from the group consisting of styrene, alpha-methyl styrene, alkyl esters of acrylic and methacrylic acid, acrylamide, acrylonitrile, methacrylonitrile, isoprene, butadiene, vinyl chloride, vinyl acetate, vinyl propionate, ethylene, propylene, dibutyl maleate, and dibutyl fumarate;

wherein said vinyl tertiary amine is present in the monomer charge in a concentration of from about 2 to 15%, by weight, and said beta-hydroxyalkyl ester comonomer is present in the monomer charge in a concentration of from about 65 to 90%, by weight, and said ethylenically unsaturated comonomer is present in the monomer charge in a concentration of from about 0 to 20%, by weight.

5. The process of claim 4, wherein said vinyl tertiary amine is present in the monomer charge in the form of its amine salt which has been previously prepared by reaction of said vinyl tertiary amine with an acid selected from the group consisting of formic, acetic, chloroacetic, propionic, butyric, trimethyl acetic, glycollic, citric, hydrochloric, hydrobromic, sulfuric, nitric, and phosphoric.

6. The process of claim 4, wherein said vinyl tertiary amine is dimethyl aminoethyl methacrylate; wherein said betahydroxyalkyl ester comonomer is a beta-hydroxypropyl acrylate; and wherein said other ethylenically unsaturated comonomer is acrylonitrile.

References Cited by the Examiner

UNITED STATES PATENTS

| | | | |
|---|---|---|---|
| 2,412,476 | 12/1946 | Semegen | 260—86.1 |
| 2,862,902 | 12/1958 | Pritchard | 260—86.1 |
| 3,078,185 | 2/1963 | Kine et al. | 260—86.1 |

JOSEPH L. SCHOFER, *Primary Examiner.*

DONALD E. CZAJA, *Examiner.*